United States Patent
Trattler

(10) Patent No.: US 9,451,667 B2
(45) Date of Patent: Sep. 20, 2016

(54) OPTICAL SENSOR CIRCUIT, LUMINOUS PANEL AND METHOD OF OPERATING AN OPTICAL SENSOR CIRCUIT

(71) Applicant: ams AG, Unterpremstaetten (AT)

(72) Inventor: Curd Trattler, Judendorf-Strassengel (AT)

(73) Assignee: AMS AG, Unterpremstaetten (AT)

( * ) Notice: Subject to any disclaimer, the term of this patent is extended or adjusted under 35 U.S.C. 154(b) by 0 days.

(21) Appl. No.: 14/541,082

(22) Filed: Nov. 13, 2014

(65) Prior Publication Data
US 2015/0069918 A1    Mar. 12, 2015

Related U.S. Application Data

(63) Continuation-in-part of application No. 14/276,960, filed on May 13, 2014.

(30) Foreign Application Priority Data

May 15, 2013 (EP) .................................... 13167847
Jan. 22, 2014 (EP) .................................... 14152147

(51) Int. Cl.
*G01J 3/50* (2006.01)
*H05B 33/08* (2006.01)
(Continued)

(52) U.S. Cl.
CPC ......... *H05B 33/0854* (2013.01); *G01J 1/0488* (2013.01); *G01J 3/506* (2013.01); *H05B 33/0872* (2013.01); *G01J 2001/4252* (2013.01)

(58) Field of Classification Search
CPC ....................................................... G01J 3/50
USPC ........ 315/291, 294, 299, 308, 360; 250/216, 250/226
See application file for complete search history.

(56) References Cited

U.S. PATENT DOCUMENTS

| 8,324,830 B2* | 12/2012 | Peker ................... H05B 33/086 315/291 |
| 2007/0216611 A1* | 9/2007 | Chang .................. G09G 3/3208 345/76 |
| 2007/0216622 A1 | 9/2007 | Kim et al. |

(Continued)

FOREIGN PATENT DOCUMENTS

WO    WO-2008/105093 A1    9/2008

*Primary Examiner* — Thuy Vinh Tran
(74) *Attorney, Agent, or Firm* — McDermott Will & Emery LLP

(57) ABSTRACT

An optical sensor circuit comprises an optical sensor (DET) designed to provide a sensor signal indicative of a color of light incident on the optical sensor (DET), a clock designed to provide a clocked control signal comprising consecutive high and low states, and a controller unit (CU) connected to the optical sensor (DET) and comprising the clock. The controller unit (CU) is designed to process the sensor signal as a color signal (CTS) in a first mode if the clocked control signal is in a high state, wherein the color signal (CTS) is indicative of a color of light emitted by a light emitting device (LED) to be connected at a control terminal (OUT). The controller unit (CU is further designed to process the sensor signal as an ambient color light signal (aCTS) in a second mode if the clocked control signal is in a low state, wherein the ambient color light signal (aCTS) is indicative of a color of ambient light. The controller unit (CU) is also designed to generate a driving signal (PWM) to drive the light emitting device (LED), wherein the driving signal (PWM) depends on the color and ambient color light signals (CTS, aCTS).

15 Claims, 5 Drawing Sheets

Figure 1:
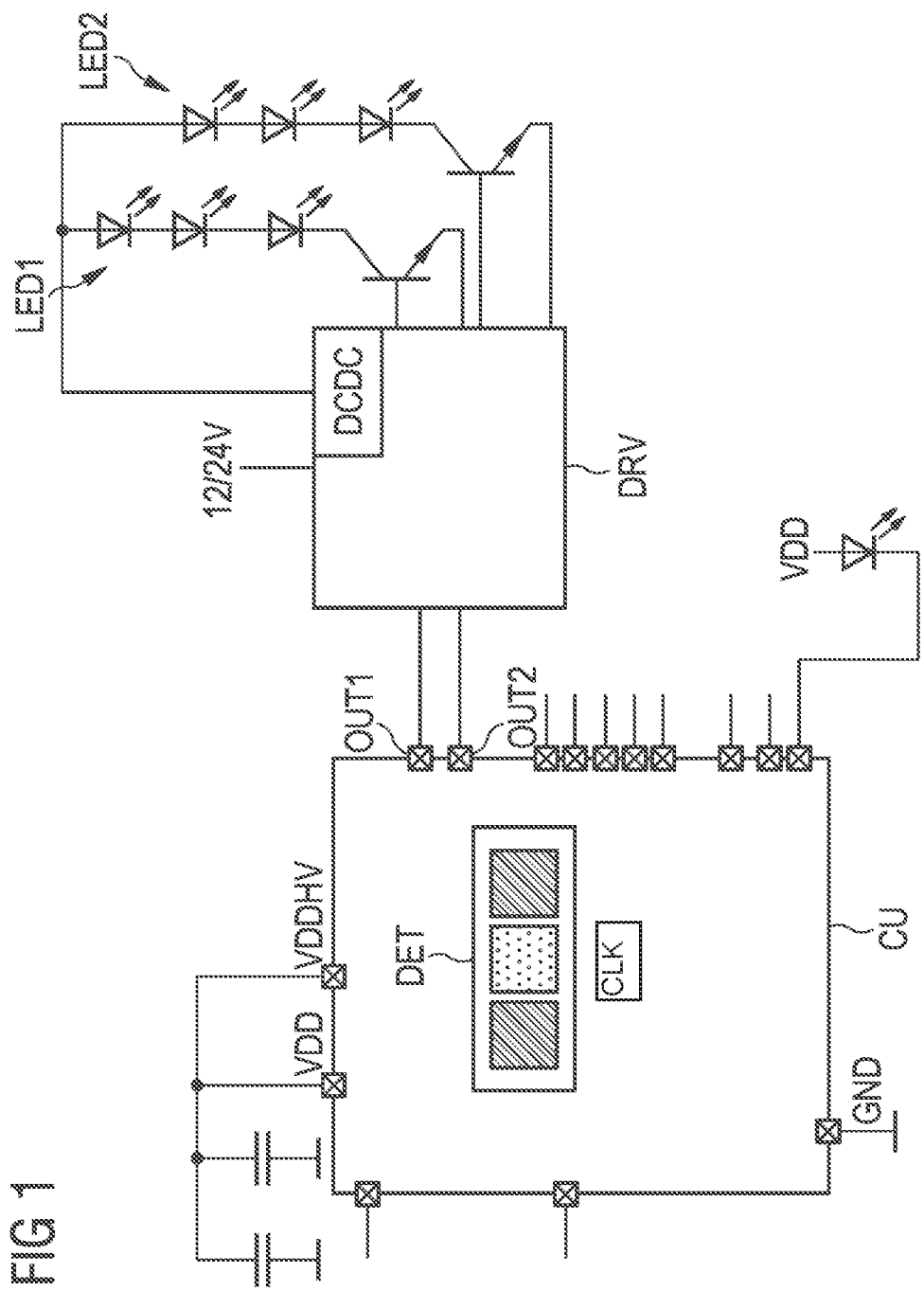

(51) Int. Cl.
    *G01J 1/04*    (2006.01)
    *G01J 1/42*    (2006.01)

(56) References Cited

U.S. PATENT DOCUMENTS

| | | |
|---|---|---|
| 2008/0074872 A1 | 3/2008 | Panotopoulos |
| 2009/0167195 A1 | 7/2009 | Katsu |
| 2009/0224678 A1* | 9/2009 | Wang .................. G09G 3/3426 315/158 |
| 2009/0284692 A1 | 11/2009 | Yang et al. |
| 2010/0207531 A1 | 8/2010 | Peker et al. |
| 2011/0187273 A1 | 8/2011 | Summerford et al. |
| 2011/0279040 A1 | 11/2011 | Briggs et al. |
| 2012/0081033 A1 | 4/2012 | Sun et al. |
| 2012/0188207 A1 | 7/2012 | Usukura et al. |

* cited by examiner

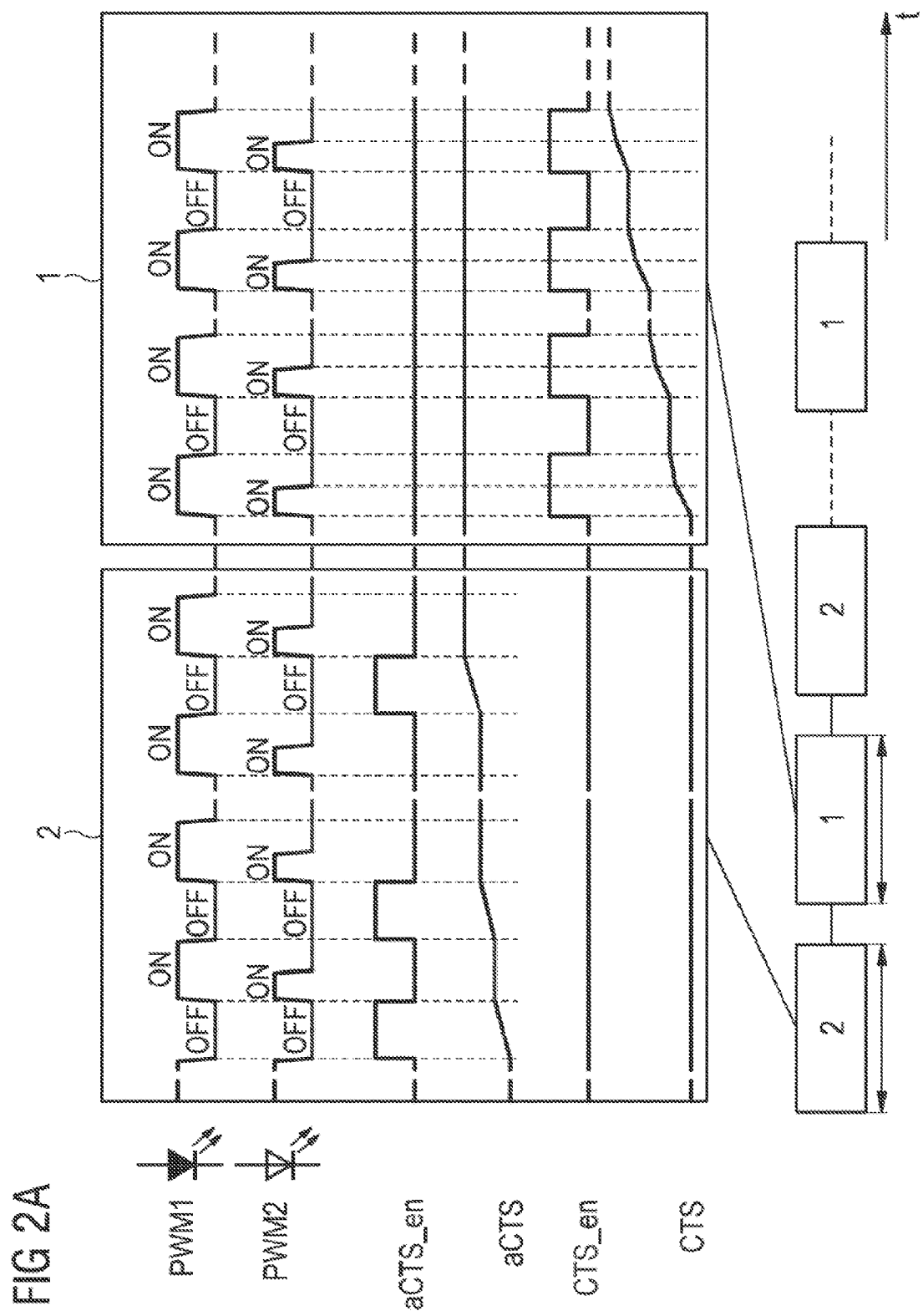

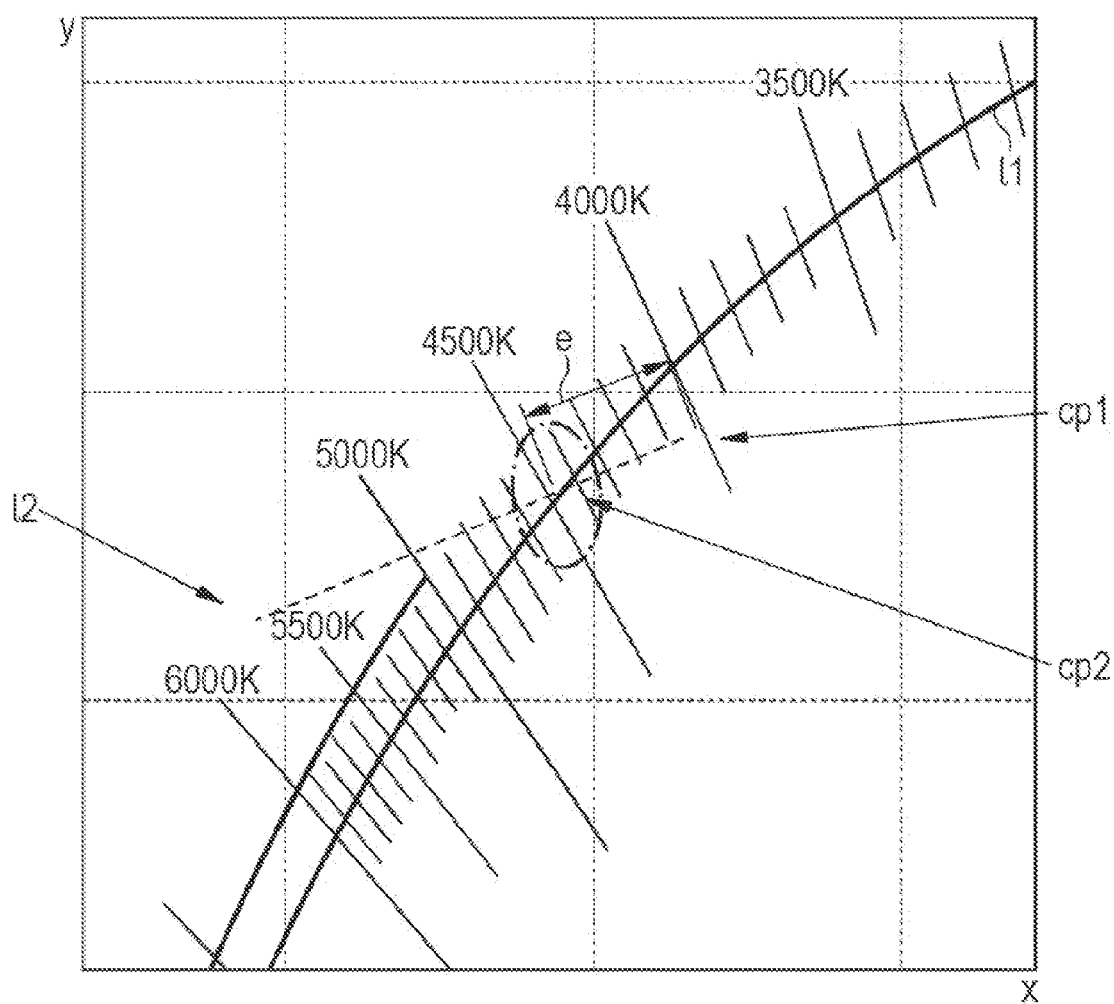

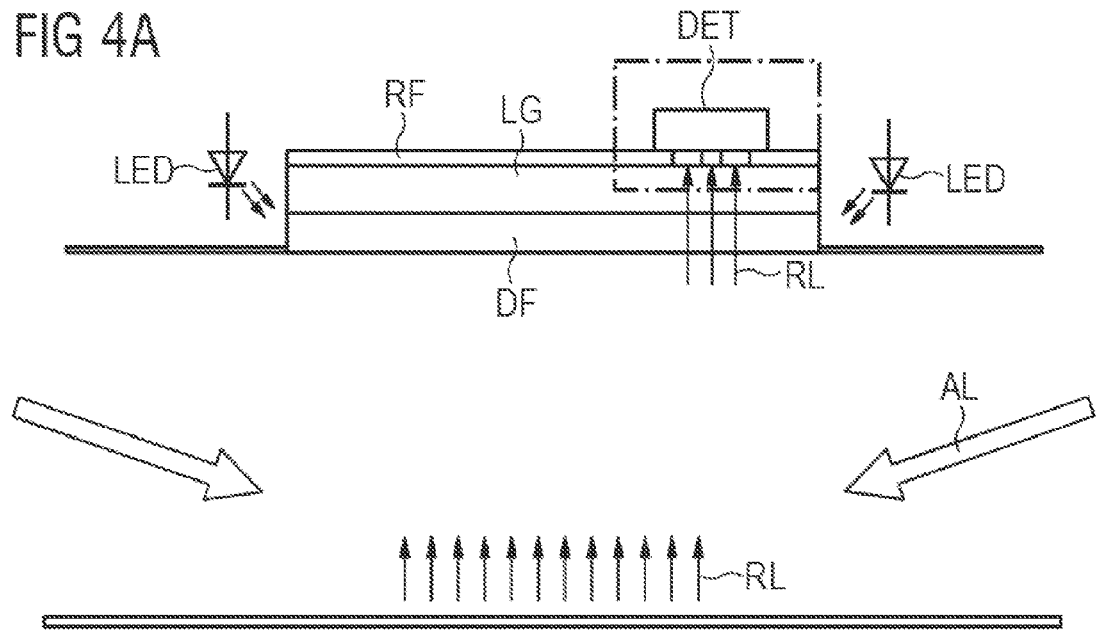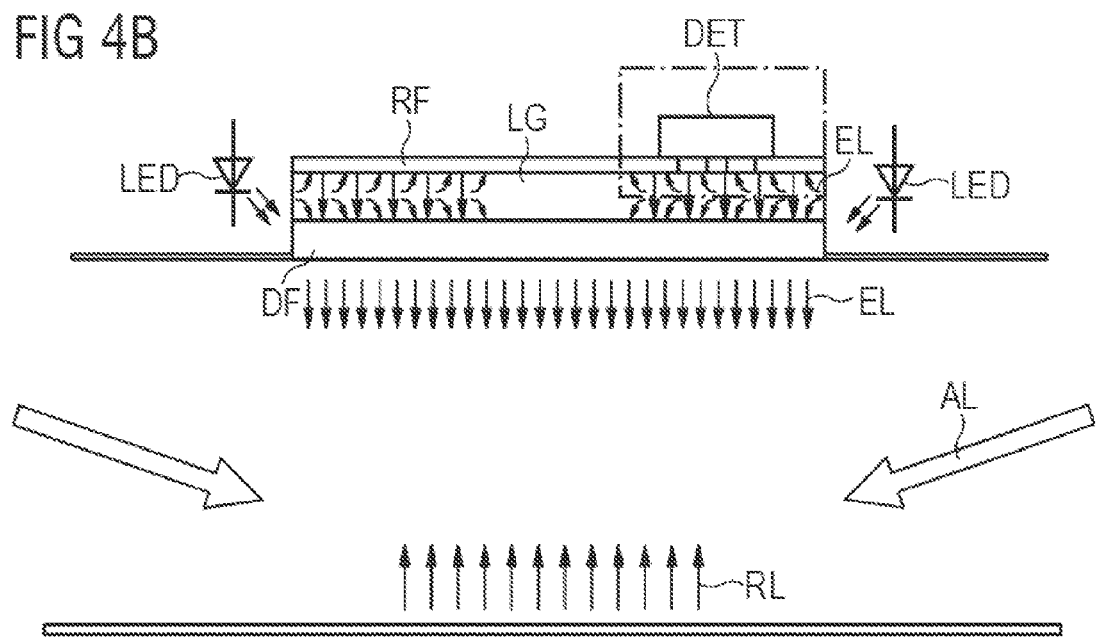

OPTICAL SENSOR CIRCUIT, LUMINOUS PANEL AND METHOD OF OPERATING AN OPTICAL SENSOR CIRCUIT

CROSS-REFERENCE TO RELATED APPLICATIONS

The present application is a continuation-in-part application of U.S. patent application Ser. No. 14/276,960, entitled "Optical Sensor Circuit, Luminous Panel And Method For Operating An Optical Sensor Circuit," filed on May 13, 2014, which claims the benefit of priority from European Patent Application No. 13167847.6, filed on May 15, 2013 and European Patent Application No. 14152147.6, filed on Jan. 22, 2014, all of which are hereby incorporated by reference in their entirety for all purposes.

DESCRIPTION

This invention relates to an optical sensor circuit, to a luminous panel and to a method for operating an optical sensor circuit.

Light emitting diodes or LEDs find increasing application in electric lighting. For example, flat light luminaries or panels comprise diffusers framed by an array of light emitting diodes (LEDs) to illuminate larger areas and are applied in back light illuminated displays and LED light guides. Luminaries may support color tuning capabilities. This can be obtained by mixing together of different contributions of different types of LEDs, e.g. cold and warm white light LEDs, in order to achieve a desired correlated color temperature (CCT).

A color sensor can be placed inside the luminaire in order to directly sample the light, e.g. color point x, y of the luminaire. The color sensor is placed behind a light guide and a diffuser in order to measure the color temperature. Based on this color point, the CCT value (e.g. based on the McCamy formula) is calculated and transferred to a control loop (PID) to adjust the LEDs accordingly to obtain a constant correlated color temperature (CCT) over temperature and lifetime of the luminaire.

This approach, however, has limited performance because the color point does not only depend on the light of the LEDs but also on the color of surrounding ambient light entering the luminaire. Especially in market places or exhibitions with many rather strong different light sources around, the accuracy of the CCT measurement can be significantly degraded. The result is a wrong positioning of the luminaire's color point and consequently the CCT value.

The object of this invention is to provide an optical sensor circuit, a luminous panel and a method for operating an optical sensor circuit which overcomes the above mentioned problems, and, in particular, improves the CCT measurement.

This object is solved by the subject matter of the independent claims. Further developments and embodiments relate to dependent claims.

According to an aspect of the invention, an optical sensor circuit comprises an optical sensor, a clock and a controller unit connected to both the optical sensor and to the clock. The optical sensor is designed to provide a sensor signal indicative of incident light. Preferably, the sensor signal is indicative of a color of the incident light.

The clock provides a clocked control signal. The clocked control signal comprises consecutive high and low states. The clock may comprise a clock terminal in order to receive the clocked control signal from external means. In a preferred embodiment the clock is implemented on-chip. The controller unit further comprises the control terminal which can be connected to a light-emitting device or to an array of light-emitting devices.

The optical sensor circuit can be implemented in at least two ways, which may be alternatives but can be combined as well. The controller unit is designed to process the sensor signals. In particular, the controller unit is designed to process the sensor signals depending on the control signal, i.e. whether the control signal is in its high or low state. For the sake of the following discussion the controller unit processes a first sensor signal recorded during a high state of the control signal and a second sensor signal recorded during a low state of the control signal. The assignment of low and high states is interchangeable, of course.

In operation the optical sensor is exposed to light which may originate from several sources. Depending on the properties of light incident on the optical sensor, e.g. its brightness and/or color, the sensor generates a sensor signal, which is recorded as the first or second sensor signal, for example. Via the connection to the controller unit the (first and second) sensor signal is provided to the controller unit.

At the same time the controller unit receives the clocked control signal. Depending on the states, e.g. high or low, of the control signal at least two different modes of operation are set in the controller unit. Depending on the mode of operation set the controller unit performs signal processing of the (first and second) sensor signals with respect to different properties or origin of the incident light.

In the first implementation of the optical sensor circuit, the controller unit is designed to process the sensor signal as a color signal in a first mode if the clocked control signal is in high state. The sensor signal is processed as an ambient light signal in a second mode if the clocked control signal is in low state. In the terms introduced above the first sensor signal corresponds to the color signal and the second sensor signal corresponds to the ambient light signal. In fact, the color signal is indicative of a color of light emitted by a light emitting device to be connected at the control terminal. The ambient light signal is indicative of an intensity of ambient light.

In the second implementation of the optical sensor circuit, the controller unit is designed to process the sensor signal as a color signal in a first mode if the clocked control signal is in high state. The sensor signal is processed as an ambient color light signal in a second mode if the clocked control signal is in low state. In the terms introduced above the first sensor signal corresponds to the color signal and the second sensor signal corresponds to the ambient color light signal. In fact, the color signal is indicative of a color of light emitted by a light emitting device to be connected at the control terminal. The ambient color light signal is indicative of a color of ambient light.

Depending on the processing, i.e. color or ambient light in the first implementation or color light signal and ambient color light signal in the second implementation, according to the first and second mode, respectively, the controller unit generates a driving signal which is used to drive the light-emitting device to be connected at the control terminal. The driving signal depends on the color and ambient light signal or color light signal and ambient color light signal.

The term "light" hereinafter denotes electromagnetic radiation in the visible but can also include parts of the infrared and ultraviolet. Ambient light refers to any source of light that is not explicitly controlled by the optical sensor circuit, i.e. when connected to a light emitting device. The color of light, i.e. detected via the color signal is a function of wavelength. For example, the color signal can be an explicit function of wavelength or be integrated over a given spectral range. A clocked signal hereinafter comprises at least one high and low state, typically a succession of these states. The driving signal, for example, can be a clocked driving signal as well.

Preferably, the clocked signal and the driving signal is a function of high and low state but does not necessarily have to be periodic. For example, the driving signal can be of pulse width modulation type. For example, the pulse width modulation can be used for driving the light-emitting devices. The high and low states then correspond to on and off states of the light-emitting device. Preferably, light emitting diodes are used as light-emitting devices. However, other sources are possible as well, like fluorescent or incandescent lamps. If these light-emitting devices are light-emitting diodes, the pulse width modulation can be used to adjust brightness and/or color via a duty cycle of the modulation signal.

The described first implementation of the optical sensor circuit allows for ambient light measurement and color measurement using just a single optical sensor. The controller unit evaluates the sensor signal as color signal or ambient light signal using just the single sensor unit. This has the benefit of smaller size and reduced cost of the implementation of the circuit. Furthermore, there is no need to drill a hole into a luminary panel to be used with the optical sensor circuit or even an additional printed circuit board to host a dedicated ambient light sensor. In fact, the sensor can be made non-visible so as to reside behind a diffuser and detect through the diffuser. An optical separation of an ambient light sensor from a luminary is therefore not required. This allows for improved freedom of design of the luminary panel as there is no need to take of a light sensor by design.

The described second implementation of the optical sensor circuit has similar properties but allows for color light measurement of ambient light and color measurement of light emitted from connected light sources using just a single optical sensor. In fact, the optical sensor circuit offers the possibility to measure the color point of ambient light and the color of the luminaire with only one color sensor which, for example, can be mounted behind a panel of a luminaire. The color point does not only depend on the light of the light emitting device(s) but also on the surrounding ambient light entering the optical sensor or the luminaire. The positioning of the color point and consequently the CCT value can be accounted for using the driving signal to drive the light emitting device. There is no need to switch off the light emitting device(s) in order to determine the color of ambient light. The color measurements can be executed in a time frame not perceptible to human sight.

According to another aspect of the invention, the clock is coupled to the control terminal such that the clocked control signal is synchronized to the clocked driving signal.

The first and second mode of operation of the optical sensor circuit make use of the timing differences of the clocked control signal wherein timing refers to the temporal succession of high and low states. In fact, the states of the clocked signal indicate the controller unit to process the sensor signal as an ambient light signal or as color signal or, ambient color light signal and color signal.

It is also possible to define the first and second mode of operation in a different way. For example, the first mode starts with a low state of the clocked control signal and continues for a number of clock cycles, e.g. five successive high and low states. The second mode then starts after the number of clock cycles has passed, e.g. with the first high state after the five successive high and low states. It is preferred that a low state of the clocked control signal is assigned to ambient (color) light signal and a low state of the clocked control signal is assigned to color light signal. Of course this assignment can be changed. Preferably, the controller unit comprises a master clock in order to define the number of clock cycles.

One convenient source for the clocked control signal is via the driving signal provided at the control terminal. This driving signal is a clocked signal. The clocked control signal allows for separating the ambient light processing from the color light processing by synchronizing the detection via the optical sensor to the driving signal. Thereby the processing is synchronized to the state of the light emitting device, e.g. whether the light emitting device is turned on or off.

Preferably, during a low state of the control signal the light-emitting device is off. As no light is emitted in this state, and ambient light measurement or ambient color light measurement is synchronized, only light originating from the surroundings of the optical sensor circuit is recorded by the optical sensor. During a high state of the control signal the color processing of the color signal or ambient color signal is executed. During this time the light-emitting device is turned on. The sensor signals therefore record the light emitted by the light-emitting device and the light originating from the surroundings as ambient light signal or ambient color signal.

According to another aspect of the invention, the clock is coupled to the optical sensor such that the clocked control signal is synchronized to the sensor signal.

Instead of using the driving signal to synchronize, the sensor signal can be used. The light-emitting device is driven by the driving signal which is clocked into high and low states as well. Accordingly, the optical sensor will detect a low level and high level indicating that the light-emitting device is switched on and off, respectively. In turn, the succession of high and low states received in this manner can be used to generate the clocked control signal from the sensor signal. The operation of a controller unit can then be synchronized to this detected sensor signal. For example, the sensor signal indicates different brightness level of light emitted by the light-emitting device.

According to another aspect of the invention, the optical sensor is a color sensor. The color sensor can be a single device characterized by an overall spectral responsivity or can comprise several elements each being sensitive to a specific spectral range or wavelength.

According to another aspect of the invention, the color sensor comprises at least two sensor elements, in particular three sensor elements. Each of these sensor elements is sensitive to a corresponding spectral range of light and/or connected to a corresponding optical filter.

The sensor elements can be constructed to be sensitive only to a certain spectral range of light. The sensitivity can also be adjusted or additionally controlled by using optical filters which are attached to the individual sensor elements. In this way, for example, red, green and blue spectral ranges can be selected and the respective sensor signals from the individual sensor elements contain spectral properties of the light incident on the optical sensor circuit. A spectral response curve can thus be constructed. For example, the sensor elements can be photodiodes, charge coupled devices or avalanche photodiodes. Additional infrared filters can also be provided.

According to another aspect of the invention, the at least two sensor elements each generate respective sensor sub-signals indicative of light incident on the optical sensor. The controller unit comprises means to combine the sensor sub-signals as a function of wavelength of light. Then, the sensor sub-signals are processed by the controller unit as the color signal, e.g. indicating the color of light emitted by the light-emitting device.

In the first implementation the controller unit also comprises means to combine the sensor sub-signals into the ambient light signal. In this case the ambient light signal is processed, indicating the level of ambient light. For example, adding the sub-signals from the individual sensor elements results in an integral sensor signal which gives a measure of ambient light, e.g. brightness.

Preferably, in the second implementation, the color light signal and the ambient color light signal are sub-signals which are integrated by means of separated units, e.g. two signal-to-frequency converters.

According to another aspect of the invention, the driving unit comprises a signal-to-frequency converter. The sensor signal, typically a photo current, can be measured as signal amplitude or, using the signal-to-frequency converter, as a number of counts per unit time. The sensor signals are recorded for a given period of time. The signal-to-frequency converter is used to accumulate the sensor signal depending on a frequency signal applied to the converter. The more counts the optical sensor generates the stronger the sensor signal, and vice versa.

According to another aspect of the invention, a driver circuit is connected between the control terminal and the light-emitting device. A DC/DC converter is used to supply a current to the light-emitting device. A controller circuit is used to adjust brightness and/or color of the light-emitting device depending on the driving signal. The driver circuit can either be an integral part of the optical sensor circuit and be integrated on the same die or connected externally.

According to another aspect of the invention, the controller unit comprises a micro-controller and/or control logic. The functionality of the optical sensor circuit as described herein can be realized by appropriate programming of the micro-controller. Alternatively, or in addition, some or all of the presented units can be realized by logical components. For example, the optical sensor circuit can be implemented as an application-specific integrated circuit (ASIC).

According to an aspect of the invention, a luminous panel comprises a transparent luminary board, an array of light-emitting devices connected to the luminary board, an optical sensor circuit is also included according to the principles presented above and electrically connected to the array of light-emitting devices. Preferably, light-emitting diodes are used as light-emitting devices.

In the first implementation during the first mode of operation the array of light emitting diodes is turned on and, in addition to ambient light, light is emitted by the panel and reflected from nearby surfaces as reflected light back to the panel and the optical sensor. Consequently, the optical sensor detects both emitted light and ambient light as sensor signal. In the second mode of operation the array of light emitting diodes is turned off and no light is emitted from the panel. The optical sensor in this mode only detects ambient light reflected from the surroundings into the panel as reflected light.

In the second implementation during the first mode of operation the array of light emitting diodes is turned on and, in addition to ambient light, light is emitted by the panel and reflected from nearby surfaces as reflected light back to the panel and the optical sensor. Consequently, the optical sensor detects both the color of emitted light and ambient light as sensor signal. In the second mode of operation the array of light emitting diodes is turned off and no light is emitted from the panel. The optical sensor in this mode only detects ambient light reflected from the surroundings into the panel as reflected light.

The luminous panel preferably comprises a diffuser, a light guide, and a reflector which are connected with each other in a stacked fashion. The light guide is framed with the array of light emitting diodes. The light guide is adapted to guide light emitted from the light emitting diodes. The guided light will predominately enter the diffuser. The light will leave the panel as emitted light in a directed fashion. This happens either directly via the diffuser or indirectly after being reflected at reflector.

According to another aspect of the invention, the light-emitting devices comprise red, green and blue light-emitting diodes. Additionally, or alternatively, white light-emitting diodes, in particular light emitting diodes with different color temperature, e.g. cold and warm white light-emitting diodes, can be used. This way brightness and/or color of light emitted by the array can be altered by adjusting individual light-emitting diodes from the array, e.g. by changing the duty cycle of the driving signal.

Generally, mixing of red, green and blue light-emitting diodes does not result in a pleasant perception of the overall brightness and/or color of light emitted by the array. Thus, other mixing schemes apart from red, green, and blue are employed. For example, it has been found that mixing of green and blue light-emitting diodes with warm or cold white light-emitting diodes may lead to a more pleasant lighting. The mixing generally depends on the desired effect, whether it is is applied to room lighting or product showcases, for example.

According to another aspect of the invention, a method for an optical sensor circuit comprises the step of receiving light by means of an optical sensor and providing a sensor signal indicative of the incident light. Preferably, the sensor signal is indicative of a color of the incident light. Then, a clocked control signal is received comprising consecutive high and low states. The sensor signal is selectively processed as a first sensor signal in a first mode if the clocked control signal is in a high state, or processed as a second sensor signal in a second mode if the clocked control signal is in low state. Finally, a clocked driving signal is generated to drive a light-emitting device depending on the color and/or intensity of the first and second sensor signals. In the second implementation the driving signal can be used to adjust a color point, for example.

The method for optical sensor circuit can be implemented in at least two ways which may be alternatives but can be combined as well.

In the first implementation, the first sensor signal is a color signal and the second sensor signal is processed as an ambient light signal. In the terms introduced above the first sensor signal corresponds to color signal and the second sensor signal corresponds to the ambient light signal. In fact, the color signal is indicative of a color of light emitted by a light emitting device to be connected at a control terminal. The ambient light signal is indicative of an intensity of ambient light.

In the second implementation the first sensor signal is a color signal and the second sensor signal is an ambient color light signal. In the terms introduced above the first sensor signal corresponds to the color signal and the second sensor signal corresponds to the ambient color light signal. In fact, the color signal is indicative of a color of light emitted by a light emitting device to be connected at a control terminal. The ambient color light signal is indicative of a color of ambient light.

Measurement of ambient light measurement and color measurement in the first implementation and color measurement in the second implementation can be achieved by using just a single optical sensor. The sensor signal can be processed both as color signal or ambient light signal or color signal and ambient color signal. This has the benefit of smaller size and reduced cost of the implementation in a circuit. Furthermore, there is no need to drill a hole into a luminary panel to be used with the optical sensor circuit or even an additional printed circuit board to host a dedicated ambient light sensor. In fact, the sensor can be made non-visible so as to reside behind a diffuser and detect through the diffuser. An optical separation of an ambient light sensor from a luminary is therefore not required. This allows for improved freedom of design of the luminary panel as there is no need to take care of a light sensor by design.

The described second implementation of the optical sensor circuit has similar properties but allows for color light measurement of ambient light and color measurement of connected light sources using just a single optical sensor. In fact, the optical sensor circuit offers the possibility to measure the color point of ambient light and the color of the luminaire with only one color sensor which, for example, can be mounted behind a panel of a luminaire. The color point does not only depend on the light of the light emitting device(s) but also on the surrounding ambient light entering the optical sensor or the luminaire. The positioning of the color point and consequently the CCT value can be accounted for using the driving signal to drive the light emitting device.

According to another aspect of the invention, the method further comprises the step of synchronizing the clocked control signal to the driving signal.

According to another aspect of the invention, the step of synchronizing the clocked signal is performed with respect to the sensor signal.

According to another aspect of the invention, in the first mode, the control signal is processed so as to indicate a color of light emitted by the light-emitting device. Furthermore, in the second mode the ambient light signal is processed so as to indicate the level of ambient light in the first implementation. And, in the second implementation the ambient light color signal is processed so as to indicate the color of ambient light. In particular, a color point can be determined from both color light signal and ambient light color signal. These color points can be compared and, in turn, differences can be used to adjust the color of light emitted by the light-emitting device.

In the following, the principle presented above will be described in more detail with respect to drawings in which exemplary embodiments are presented.

Figure 3A:
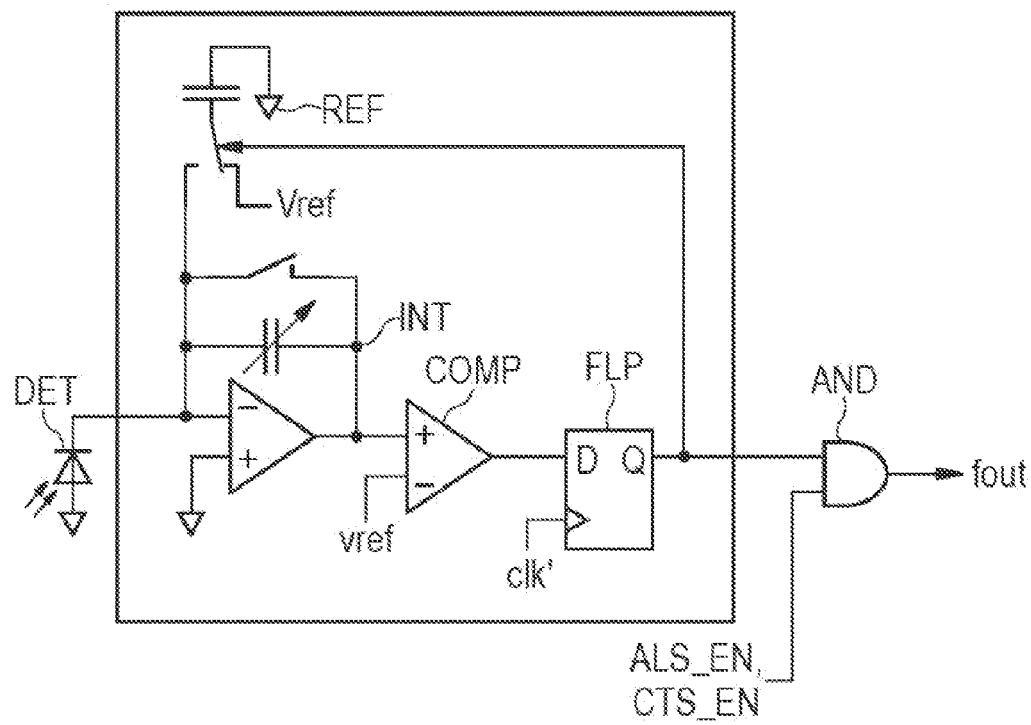
Figure 3B:
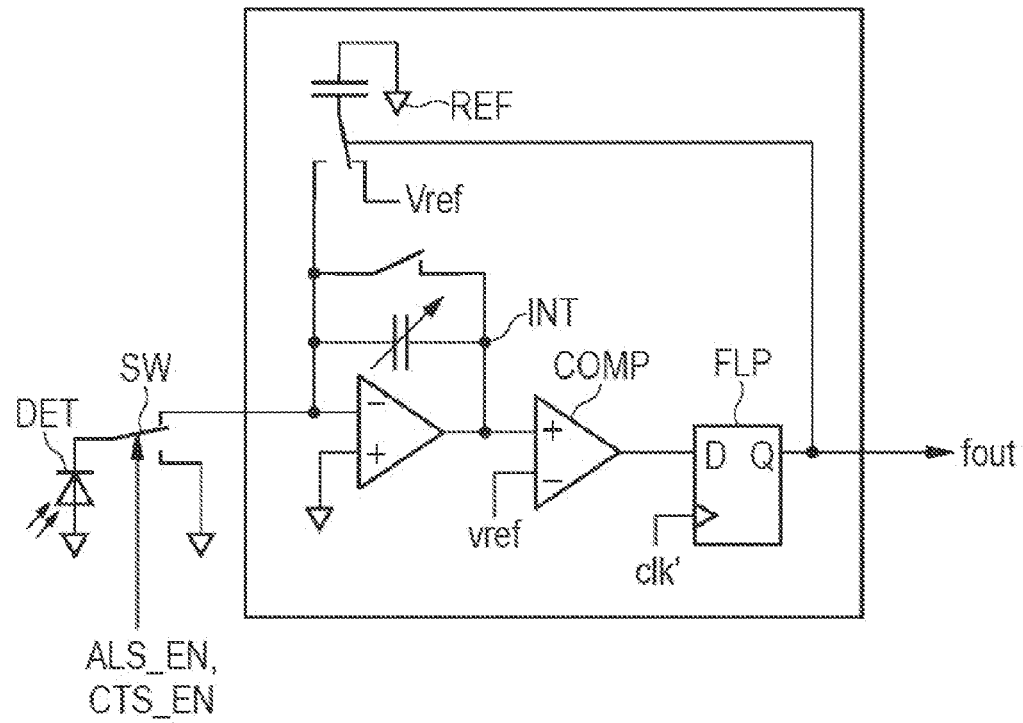

FIG. 1 shows an exemplary embodiment of an optical sensor circuit according to the principle presented, FIG. 2A shows an exemplary timing diagram of an optical sensor circuit according to the principle presented, FIG. 2B shows an exemplary chromaticity diagram of an optical sensor circuit according to the principle presented, FIGS. 3A and 3B show exemplary embodiments of a current-to-frequency converter according to the principle presented, and FIGS. 4A and 4B show an exemplary embodiment of a luminous panel according to the principle presented.

FIG. 1 shows an exemplary embodiment of an optical sensor circuit according to the principle presented. The optical sensor circuit comprises a controller unit CU, an optical sensor DET, a clock CLK, and several terminals. The terminals comprise a first and a second control terminal OUT1, OUT2. Other terminals can be provided but will not be described in further detail. Such terminals can be related to additional functionality of the controller unit CU such as dimming, switching, occupancy detection and programming. The controller unit CU is connected to the optical sensor DET. Furthermore, the controller unit CU is connected to the first and second control terminals OUT1, OUT2. All these components are preferably integrated into a common integrated circuit structure but may just as well be separate units. In particular, the optical sensor DET can be integral part of an integrated optical sensor circuit or an external component connected to the remaining circuit. The controller unit CU comprises a micro-controller or control logic. The controller unit CU may be an application-specific integrated circuit or ASIC. The components and functionality will be described in more detail below and can be implemented as dedicated hardware components like control logic, or as programmed units of the micro-controller.

The optical sensor DET preferably is a color sensor. The color sensor comprises a single or several sensor elements like photodiodes or charge coupled devices which are sensitive to visual light. The color sensor generates a sensor signal which depends on wavelength. The spectral response can be realized by a single sensor element, for example by recording several sensor signals each being spectrally separated by appropriate means such as filters, prisms or gratings. The filters have characteristic spectral transmission curves. Alternatively, several sensor elements can be used to generate respective sub-signals. Each sensor element can be sensitive to a different color or spectral range. Again, this can be implemented by filters, prisms or gratings being attached to the respective sensor element. Or the sensor elements already generate the sub-signals as a function of wavelength. In any of these cases the resulting sensor sub-signals are indicative of the color of light they detect and can be processed individually or be combined to a color signal.

The optical sensor circuit further comprises a driver circuit DRV which is connected to the first and second control terminals OUT1, OUT2. Furthermore, the driver circuit DRV is connected to an array of light emitting devices LED. A DC/DC converter is used to supply a current to light-emitting devices LED. A controller circuit is used to adjust brightness and/or color of the light-emitting device. The driver circuit can either be an integral part of the optical sensor circuit and be integrated on the same die or connected externally.

The light emitting devices LED are connected to the driver circuit DRV. Preferably, the light emitting devices are light emitting diodes, for example a first string LED1 comprising cold white LEDs and a second string LED2 comprising warm white LEDs (tunable white) and/or colored LEDs such as red, green, and blue.

The operating principle of the optical sensor circuit described above will be discussed with respect to FIG. 2A. FIG. 2A shows an exemplary timing diagram of an optical sensor circuit according to the principle presented.

The drawing shows a first driving signal PWM1 of the first string LED1 of light emitting diodes, a second driving signal PWM2 of the second string LED2 of light emitting diodes, an ambient color light enable signal aCTS_en, an ambient color light signal aCTS, a color enable signal CTS_en, and a color light signal CTS as functions of time t. The light emitting devices LED1, LED2 are sketched with their electronic symbol. The reference numeral ON indicates that a light emitting device is switched on and a reference numeral OFF indicates the light emitting device is switched off.

The operation of the optical sensor is synchronized to the timing of a clocked control signal to be provided by the clock. In the present embodiment the clocked control signal is used to define the driving signals PWM1 or PWM2 of the light emitting devices. In fact, the drawing shows the driving signal PWM1, PWM2 comprising high and low states which correlate to the LEDs being switched on or off, respectively. By switching the LEDs according to the driving signals PWM1, PWM2 both brightness and/or color can be adjusted, e.g. by means of duty cycle.

The operation of the controller unit CU is synchronized to the timing of the clocked control signal. Depending on the states of the clocked control signal the controller unit CU enters a first or second mode of operation in which the sensor signal from the optical sensor is processed differently.

In this embodiment, the first and second mode of operation are defined with respect to the clock and the first and second driving signals PWM1, PWM2 are synchronized. For example, the first mode starts and the first and second driving signal PWM1, PWM2 are in a low state OFF, and continues for a number of clock cycles, e.g. five successive high and low states ON, OFF. The second mode starts after the number of clock cycles has passed, e.g. with the first high state ON of the first or second driving signal PWM1, PWM2 after the five successive high and low states ON, OFF. During a low state OFF of the driving signals PWM1, PWM2 the light emitting devices LED1, LED2 are switched off and ambient color light signal aCTS can be recorded. During a high state ON of the driving signals PWM1, PWM2 the first and/or second string LED1, LED2 is switched on and the color light signal CTS can be recorded. Of course this assignment can be changed. Preferably, the controller unit CU comprises a master clock in order to define the number of clock cycles. In the drawing the first mode is depicted as light grey box 1 and the second mode is depicted as dark grey box 2. Generally, the first and the second mode can be defined differently. For example, first and second mode can switch synchronous to high and low states ON, OFF.

In every high state ON of the driving signal PWM1 and/or PWM2 during second mode the controller unit CU issues the color enable signal CTS_en. In this mode the sensor signal is processed as a color signal CTS. The color signal CTS includes information of the light emitted by the LEDs as it is synchronized to states in which the LEDs are turned on. However, the optical sensor also records ambient light which is present as well. The color signal CTS can be corrected for ambient light, for example, by subtracting the ambient light signal aCTS to be recorded in the first mode. In any case the color light signal CTS includes information on the color of the light emitted by the LEDs as the optical sensor generates a wavelength dependent sensor signal or a number of wavelength dependent sensor sub-signals. The controller unit CU evaluates these signals as an indication of color, or color temperature. For example, the controller unit CU comprises means to determine the color point.

In turn, the controller unit CU comprises means to adjust the driving signals PWM1, PWM2 to alter the color emitted by the LEDs. This can be achieved via the driving circuit DRV. The driving signals PWM1, PWM2 are applied to the different LEDs such that only certain strands LED1, LED2 or individual LEDs from the array are used or partly used. For example, when using cold and warm white LEDs their respective colors can be mixed to result in a desired mix, e.g. tune-able white. If LEDs of different color are used a desired mixed color can be adjusted.

In every low state OFF of the driving signals PWM1, PWM2 during the first mode the controller unit CU issues the ambient light enable signal aCTS_en. In this mode the sensor signal is processed as an ambient color light signal aCTS. The ambient color light signal aCTS includes information on the light originating from the surroundings of the optical circuit it is synchronized to states in which the LEDs are turned off. In order to evaluate the sensor signal as ambient color light signal aCTS the controller unit CU comprises means process the sensor signal or the sensor sub-signals such as to indicate the color of ambient light.

The means to adjust the driving signals PWM1, PWM2 of the controller unit CU can be used to alter the brightness and/or color emitted by the LEDs. For example, this can be achieved by adjusting the duty cycle of the driving cycle, i.e. adjust the timing of high and low states or adjust the times during which the LEDs are turned on and off, respectively. This way the color point characterizing the emitted light can also be adjusted.

In another embodiment not shown, the clock is coupled to the optical sensor DET. This way the clocked control signal can be synchronized to the sensor signal. The optical sensor will detect a low level and high level indicating that the light-emitting device is switched on and off, respectively. The succession of high and low states received in this manner is clocked. The operation of a controller unit CU can then be synchronized to the sensor signal in the way described above, e.g. with respect to FIG. 2A. For example, the sensor signal indicates different brightness level of light emitted by the light-emitting device.

This embodiment can also be used if the signal for driving of the LEDs is not available, e.g. the optical sensor is separated from the LED driving circuit. Thus, it is possible to distinguish ambient color light signal from the LED light signal by level. For example, the light brightness is measured every 1 ms. If the measured sensor signal is low, this level is used as ambient light signal. Once the signal is high this sensor signal is used as color signal. Any measurements which have a level in-between, e.g. caused by 50% ambient light and 50% LED light are discarded. For example, due to the concept of the sensor placement close to a luminary it can be assumed that the signal from the light emitting device is substantially higher compared to the signal from the ambient light. Therefore, the above approach can separate these two levels easily.

FIG. 2B shows an exemplary chromaticity diagram of an optical sensor circuit according to the principle presented, for example, according to the CIE 1976 standard (CIE: International Commission on Illumination). The drawing shows a cutout of a color space which can be characterized by chromaticity coordinates x, y (or, in a different representation by coordinates u', v'). Line 11 indicates the chromaticity of black-body radiation sources of various temperatures, e.g. 3500 K to 6000 K.

The control unit CU comprises processing means to process the ambient color light signal aCTS and the color light signal CTS. By subtracting the measured values of PWM=ON and PWM=OFF, the emitted color of the light emitting devices is obtained by following system equations:

PWM1,PWM2=OFF: color1=color(ambient)

PWM1,PWM2=ON: color2=color(ambient)+color(LED1,LED2), wherein color1 and color2 are the recorded color points of the first and second mode, respectively (see reference numerals cp1 and cp2 in the drawing). Clearly, during the first mode when all light emitting devices are switched off the determined first color point colon corresponds to the color of the ambient light only (color(ambient)). During the second mode, however, all light emitting devices are at least partly switched on and the determined second color point color2 corresponds to the color of the light emitting devices LED1, LED2 and the ambient light. In summary, this leads to an error e in the desired color point which must be accounted for.

The effective color of the light emitting devices color (LED1, LED2) can be obtained by subtracting the measured values:

color2−color1=color(ambient)+color(LED1,LED2)−color(ambient)=color(LED1,LED2)

The value of color(LED1, LED2) is the color produced by the LEDs themselves. Therefore, the correct color point and consequently the correct CCT value can be obtained.

FIG. 2B shows the mixing of the luminaire light and the surrounding light sources. In this example, surrounding light generates a CCT value of 5700K, the luminaire generates 4000K. The mixed result gives a wrong CCT value of 4470K (see line 12). By using above described method, the correct CCT value can be calculated.

FIGS. 3A and 3B show exemplary embodiments of a current-to-frequency converter according to the principle presented. The drawings show too alternative implementations of a current-to-frequency converter which is used as part of the controller unit to acquire the sensor signal from the optical sensor DET.

In FIG. 3A the optical sensor DET is connected to a switchable integrator INT and a reference circuit REF. The integrator INT is further connected to a flip-flop FLP via a comparator COMP. An output of the flip-flop FLP is connected to the reference circuit REF and to a logic gate AND. The logic gate AND comprises an enable input to be provided with an enable signal.

The current-to-frequency converter is basically used to acquire the sensor signal which, for example, is a photocurrent generated in a photodiode, for a given period of time. From FIG. 2A it is apparent that the sensor signals aCTS and CTS are accumulated with each measurement initiated by the enable signals aCTS_en and CTS_en. The so acquired sensor signals are translated into counts per time using the current-to-frequency converter.

In particular, the sensor signals are integrated by means of the integrator INT. The integrated sensor signal ramps up and is provided at an input of the comparator COMP. There it is compared with a reference vref. Every time the integrated sensor signal reaches the level of the reference the comparator COMP is set to its high state. The flip-flop FLP generates a measure of such high states per time. A time reference is applied to the flip-flop FLP via a clock signal clk'. the flip-flop FLP outputs a count signal fOUT which is indicative of the measured sensor signal as counts per time, the time being set by the clock signal clk'. The count signal fOUT is fed to the reference circuit REF in order to initiate a reset to a reference level. The count signal fOUT is also fed to the logic gate AND. The count signal fOUT is read out if the enable signal is set at the enable input.

The embodiment of FIG. 3B is similar to the one described above. The logic gate AND, however, is replaced by a switch SW connected between the optical sensor DET and the integrator INT. The enable signal aCTS_EN, CTS_EN controls the switch SW such as to enable current-to-frequency conversion only when it is applied to the circuit.

FIGS. 4A and 4B show an exemplary embodiment of a luminous panel according to the principle presented. The drawings show a section of the planar luminous panel during the first (FIG. 4B) and second mode (FIG. 4A) of operation of the optical sensor circuit (implied by the dashed box in the drawings).

The luminous panel comprises a diffuser DF, a light guide LG, and a reflector RF which are connected with each other in a stacked fashion. The light guide LG is framed with an array of light emitting diodes LED as indicated by individual diode electrical symbols. The light guide LG is adapted to guide light emitted from the light emitting diodes LED. The guided light will predominately enter the diffuser DF. The light will leave the panel as emitted light EL in a directed fashion. This happens either directly via the diffuser DF or indirectly after being reflected at reflector RF.

FIG. 4A shows the situation during the second mode of operation. During this mode the light emitting diodes LED are turned off no light EL is emitted from the panel. The optical sensor DET in this mode only detects ambient light AL reflected from the surroundings into the panel as reflected light RL.

FIG. 4B shows the situation during the first mode of operation. During this mode the light emitting diodes LED are turned on and, in addition to ambient light AL, light EL is emitted by the panel and reflected as reflected light RL back to the panel and the optical sensor DET. Consequently, the optical sensor DET detects both emitted light EL and ambient light AL as sensor signal.

What is claimed is:

1. An optical sensor circuit, comprising:
   an optical sensor designed to provide a sensor signal indicative of a color of light incident on the optical sensor,
   a clock providing a clocked control signal comprising consecutive high and low states, and
   a controller unit connected to the optical sensor and comprising the clock, and designed to process the sensor signal as a color signal in a first mode if the clocked control signal is in a high state, wherein the color signal is indicative of a color of light emitted by a light emitting device to be connected at a control terminal, and to process the sensor signal as an ambient color light signal in a second mode if the clocked control signal is in a low state, wherein the ambient color light signal is indicative of a color of ambient light, and the controller unit is further designed to generate a driving signal to drive the light emitting device, wherein the driving signal depends on a color point which is determined from the color and ambient color light signals.

2. The optical sensor circuit according to claim 1, wherein the clock is coupled to the control terminal such that the clocked control signal is synchronized to the driving signal.

3. The optical sensor circuit according to claim 1, wherein the clock is coupled to the optical sensor such that the clocked control signal is synchronized to the sensor signal.

4. The optical sensor circuit according to claim 1, wherein the optical sensor is a color sensor.

5. The optical sensor circuit according to claim 4, wherein the color sensor comprises at least two sensor elements, in particular three sensor elements, each sensor element being at least one of sensitive to a corresponding spectral range of light or connected to a corresponding optical filter.

6. The optical sensor circuit according to claim 5, wherein the at least two sensor elements each generate respective sensor sub-signal indicative of light incident on the optical sensor, wherein controller unit comprises means to
   combine the sensor sub-signals as a function of wavelength of light and process the sensor sub-signals as the color signal indicating the color of light emitted by the light emitting device, and
   combine the sensor sub-signals to the ambient color light signal and process the ambient light signal indicating the color of ambient light.

7. The optical sensor circuit according to claim 1, wherein the controller unit comprises a signal-to-frequency converter.

8. The optical sensor circuit according to claim 1, wherein a driver circuit is connected between the control terminal and the light emitting device, comprising:
   a dc/dc converter to supply a current to the light emitting device, and
   a controller circuit to adjust at least one of brightness or color of the light emitting device depending on the driving signal.

9. The optical sensor circuit according to claim 1, wherein the controller unit comprises at least one of a microcontroller or control logic.

10. A luminous panel, comprising:
    a transparent luminary board,
    an array of light emitting devices connected to the luminary board, and
    an optical sensor circuit according to claim 1 electrically connected to the array of light emitting devices.

11. The luminous panel according to claim 10, wherein the array of light emitting devices comprises at least one of
    red, green, and blue light emitting diodes, or
    white light emitting diodes, in particular light emitting diodes with different color temperature.

12. A method for an optical sensor circuit, comprising the steps of:
    receiving light by means of an optical sensor and providing a sensor signal indicative of the incident light,
    receiving a clocked control signal comprising high and low states,
    selectively processing the sensor signal as a color signal in a first mode if the clocked control signal is in high state, and processing the sensor signal as an ambient color light signal in a second mode if the clocked control signal is in low state, and
    generating a driving signal to drive a light emitting device depending on a color point which is determined from the color and ambient color light signals.

13. The method according to claim 12, further comprising the step of synchronizing the clocked control signal to the driving signal.

14. The method according to claim 12, further comprising the step of synchronizing the clocked control signal to the sensor signal.

15. The method according to claim 12, wherein
    in the first mode the color signal is processed such as to indicate the color of light emitted by the light emitting device, and
    in the second mode the ambient color light signal is processed such as to indicate the color of ambient light.

* * * * *